(12) United States Patent
Aaron et al.

(10) Patent No.: US 7,728,735 B2
(45) Date of Patent: Jun. 1, 2010

(54) METHODS, APPARATUS, AND COMPUTER PROGRAM PRODUCTS FOR ESTIMATING A MOOD OF A USER, USING A MOOD OF A USER FOR NETWORK/SERVICE CONTROL, AND PRESENTING SUGGESTIONS FOR INTERACTING WITH A USER BASED ON THE USER'S MOOD

(75) Inventors: Jeffrey Aaron, Atlanta, GA (US);
Robert C. Streijl, Cumming, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 345 days.

(21) Appl. No.: 11/949,943

(22) Filed: Dec. 4, 2007

(65) Prior Publication Data
US 2009/0140864 A1 Jun. 4, 2009

(51) Int. Cl.
*G08B 23/00* (2006.01)
(52) U.S. Cl. .................................. 340/573.1; 340/522
(58) Field of Classification Search .............. 340/573.1, 340/539.12, 539.22, 539.26, 539.14, 522
See application file for complete search history.

(56) References Cited
U.S. PATENT DOCUMENTS

| | | | |
|---|---|---|---|
| 5,945,988 A * | 8/1999 | Williams et al. ............... 725/46 |
| 6,611,206 B2 * | 8/2003 | Eshelman et al. ........ 340/573.1 |
| 2002/0005784 A1 * | 1/2002 | Balkin et al. ............. 340/573.1 |
| 2007/0089125 A1 * | 4/2007 | Claassen ................... 340/573.1 |
| 2009/0002178 A1 * | 1/2009 | Guday et al. ............. 340/573.1 |
| 2009/0226043 A1 * | 9/2009 | Angell et al. ............. 340/573.1 |

OTHER PUBLICATIONS

The Next Step in Face Detection Identifies Gender and Mood, [online]; [retrieved on Sep. 20, 2007]; retrieved from the Internet http://www.dcviews.com/press/Face-detection.htm.
'Biomaps' Tracek Urbanite Moods, [online]; [retrieved on Sep. 20, 2007]; retrieved from the Internet http://dsc.discovery.com/news/2006/08/11/moodmap_tec.html?category=technology&guid....

* cited by examiner

*Primary Examiner*—John A Tweel, Jr.
(74) *Attorney, Agent, or Firm*—Cantor Colburn LLP (57) ABSTRACT

A mood of a user is estimated based on a user's profile, data indicative of a user's mood received from a communication device associated with the user and from sources other than the user, and environmental data with a potential impact on the user's mood. Data indicative of the user's mood and the environmental data are processed to filter out data that is not relevant to the user's mood. The filtered data is cross-correlated with the user profile, and the mood of the user is estimated based on the cross-correlated filtered data. A network and services may be controlled based on a user's mood. Suggestions for interacting with the user may be generated based on the user's mood.

15 Claims, 10 Drawing Sheets

METHODS, APPARATUS, AND COMPUTER PROGRAM PRODUCTS FOR ESTIMATING A MOOD OF A USER, USING A MOOD OF A USER FOR NETWORK/SERVICE CONTROL, AND PRESENTING SUGGESTIONS FOR INTERACTING WITH A USER BASED ON THE USER'S MOOD

BACKGROUND

Exemplary embodiments relate generally to user mood detection, and more particularly, to estimating a user's mood and reacting to the user's mood.

Customers/users of communication devices are not unchanging. On the contrary, customers are highly dynamic. In particular, the emotional state of a customer can and often does change dramatically. To ensure customer/user satisfaction, the customer should be treated in a manner that is appropriate for the customer's emotional stare or "mood".

In human interactions, mood changes are largely apparent and automatic. There are known techniques for detecting mood of a customer/user, based. e.g., on tone of voice detection, detection of keywords, detection of repetitive dialing of "0", facial analysis, etc. While these mood detection techniques are useful, they do not take into account factors external to the user that may affect the user's mood.

When service providers interact with a customer, taking into account the customer's mood is highly desirable since this allows the service provider to appropriately react to the user's mood. However, as new services become increasingly rich in terms of capabilities and possibilities, and related interaction possibilities expand in scope and complexity, it will be increasingly complex and critical to consider a user's mood in many respects and in all contexts relevant to the relationship between the service provider and the user.

SUMMARY

According to one embodiment, a method, apparatus, and computer program product are provided for estimating a mood of a user. A user's profile is received. Also, data indicative of a user's mood is received from a communication device associated with the user and from sources other than the user. Environmental data with a potential impact on the user's mood is also received. The data received from the communication device and from sources other than the user and the environmental data are processed to filter out data that is not relevant to the user's mood. The filtered data is cross-correlated with the user profile, and the mood of the user is estimated based on the cross-correlated filtered data.

According to another embodiment, a method is provided for controlling a network and services based on a user's mood. Information indicative of a user's mood is obtained, and network and service policies are altered based on the user's mood. The altered network and service policies are distributed to elements within a network associated with the user to change the behavior of the service and improve the user's experience/mood. Alternatively, or in addition, direct actions may be taken with regard to network elements and/or application entities in the network associated with the user based on the user's mood.

According to yet another embodiment, a method for presenting suggestions for interacting with a user based on a user's mood is provided to, e.g., service provider help desk personnel. Information is obtained indicating a mood of the user, and suggestions for interacting with the user are generated based on the user's mood and rules regarding interactions with the user. The suggestions for interacting with the user are presented.

Other devices, systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring, now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Mood is important in determining, adjusting, and optimizing interactions with users. According to exemplary embodiments, a user's mood can be detected with some degree of accuracy, and policy rules can be used to help determine a user's mood. Various inputs can be used to help in this determination, including both user-originated inputs, as well as external inputs not specifically related to the user. For external inputs, an additional step may be used to determine relevance of the inputs to a specific user.

According to one embodiment, a user's mood is estimated based on a collection of input data. The input data may include verbal inputs (e.g., detected voice), written text (e.g., emails, web comments, web responses), actions, logged history of these, etc. Additional external inputs may be utilized, as well, e.g., the presence and nature of stressful news events. These inputs may be cross-correlated with items in a user's profile to help determine the relevancy of the input. The input data may be parsed and processed to select data relevant to a user's mood and filtered to remove data not relevant to the user's mood. Data relevant to mood may include, e.g. frequency of repeated events, series or scripts (e.g., indicating frustration), volume and stress indicators in voice, various indicators and patterns in written inputs, etc. The filtered data may be processed based on predetermined rules, algorithms, and thresholds to produce a mood "estimate".

According to another embodiment, mood information may be used for service/network control. Based on a mood of a user, current actions and delayed actions may be affected, policy rule changes may be made and/or other direct actions may be taken to affect future decisions and/or actions with regard to the user. In extreme cases, the user's mood may trigger mood influencing via special policy rules applied to actions. Direct actions may include sending commands, control messages, signaling messages, etc., which may be received by network elements and/or application entities. These elements and/or entities may then respond in preconfigured ways, such that appropriate actions are implemented.

According to yet another embodiment, mood information may be generated and published in various forms for use by, e.g., a service provider or a third party, including automated applications, human service representatives, etc. This may include providing mood metrics to a machine or software interface for use by other applications, as well as providing one or more displays or display fields for viewing by humans. Thus, the mood information may be published in both machine-readable and human-usable forms.

Figure 1:
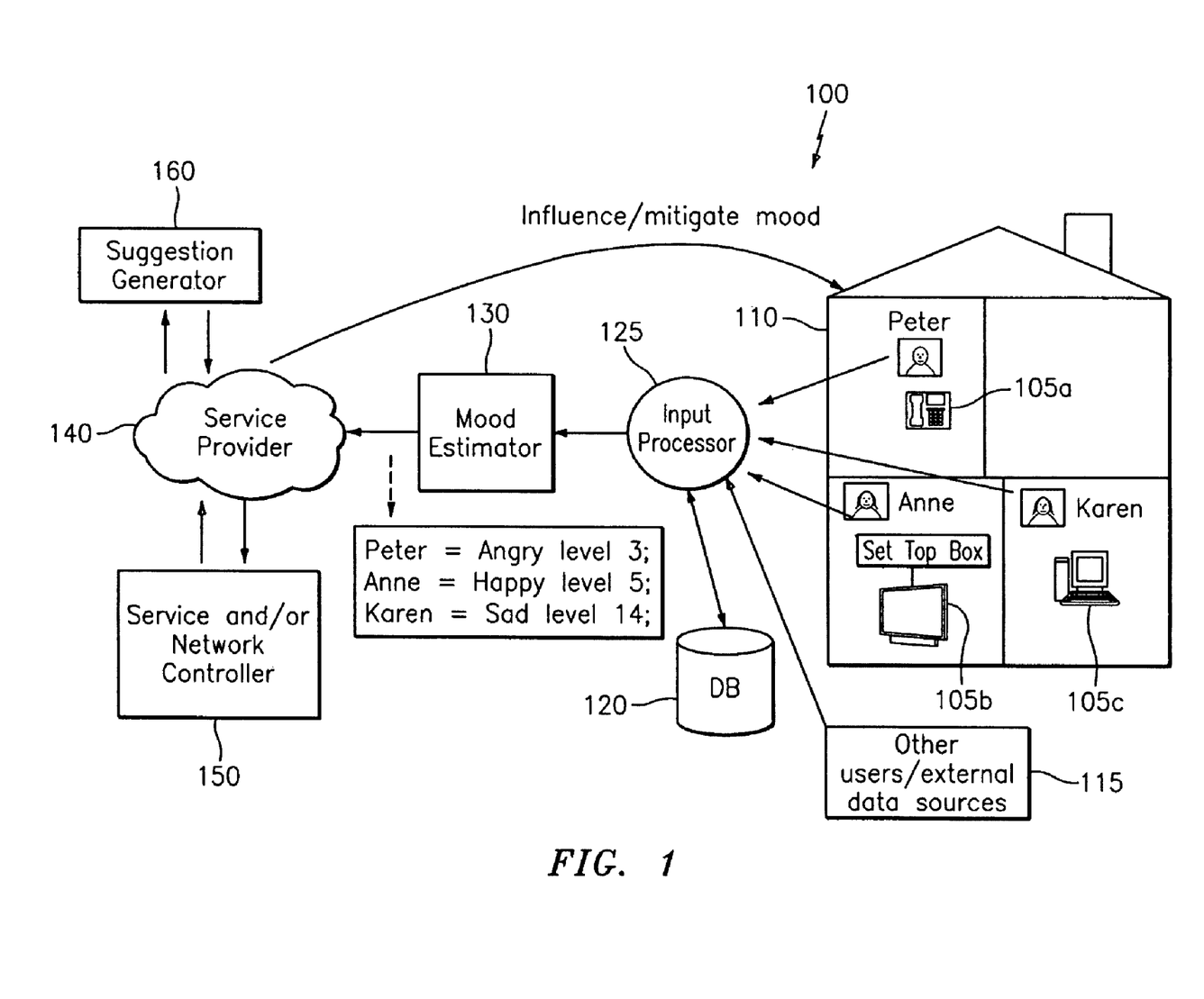
FIG. 1 illustrates an exemplary system for estimating a user's mood, using the user's mood to affect network/service policies, and generating suggestions for interacting with the user based on the user's mood according to exemplary embodiments.

FIG. 1 illustrates an exemplary implementation of a system 100 for estimating moods of various users and using the user mood information to affect network/service policies and generate suggestions for interacting with the users. It should be appreciated that the system illustrated in FIG. 1 and described below is intended to be an example and should not be considered limiting. In the system of FIG. 1, information regarding users' moods is collected from various communication devices. For example, information regarding the mood of a user "Peter" is collected from a phone 105a, information regarding the mood of a user "Anne" is collected from a set-top box 105b, and information regarding the mood of a user "Karen" is collected from a personal computer 105c. In FIG. 1, examples of communication devices are depicted for illustrative purposes as being within the same facility 110, e.g., an apartment building or office building. However, it should be appreciated that information may be collected from any type of communication device at any location.

Information that may be indicative of the user's mood is also obtained from other users. External, nonuser specific information that may potentially affect the user is also collected. This data may be collected from various sources, collectively represented in FIG. 1 as element 115.

The collected user mood information is received by an input processor 125 via a link, such as a wireless or wireline link, or via a network, such as a wireless or wireline network, a broadband network, a Wide Area Network (WAN), or any other suitable communication network. Information regarding the users is obtained from a policy/profiling database 120 that stores user profiles. The database 120 may be part of a network that serves the users operating the communication devices 105a, 105b, and 105c, and information regarding each user may be stored in the database 120 in advance and updated as appropriate. The input processor 125 formats/pre-processes raw inputs from the communication devices 105a, 105b, and 105c and the database 120 and provides the processed information to a mood estimator 130. The type and degree of processing occurring in the input processor 125 may vary with the details of implementation. But, as an example, the processing performed by the input processor 125 may include reformatting, scaling, translating, selecting, filtering, cross-correlating, parsing, and generating relevancy metrics as is further discussed below.

The mood estimator 130 estimates the moods of the users based on the processed information from the input processor 125. According to exemplary embodiments, the estimated user mood information is delivered to a service/network controller 150 and a suggestion generator 160 via links in a network 140. The network 140 may include, e.g., a wireless or wireline network, a broadband network, a Wide Area Network (WAN), the Internet, or any other suitable network. The mood information may take the form of a mood metric indicating the mood and the level or severity of the mood. In the example shown in FIG. 1. Peter's mood is "Angry level 3", Anne's mood is "Happy Level 5", and Karen's mood is "Sad level 14". The suggestion generator 160 receives the user mood information and generates suggestions for interacting with the user. The network/service controller 150 generates actions to take within a network and/or with regard to services provided by a network based on the mood. Although not shown for simplicity of illustration, the suggestion generator 160 and the network/service controller 150 also receive user profile information, information from individual users, information from other users, and information from external sources and use this information, along with the mood information, to generate suggestions and alter network/service policies.

Although shown as separate components for illustrative purposes, it should be appreciated that one or more of the input processor 125, database 120, mood estimator 130, network/service controller 150 and suggestion generator 160 may be part of the same network as the network serving the communication devices 105a, 105b, and 105c, e.g., the network 140. The locations of these functional components depend, e.g., on the business model, scale of the offering, and applications used. The components may communicate with each other via suitable links in the network, including e.g., a wireless or wireline network, a broadband network, a Local Area Network (LAN), a Wide Area Network (WAN), the Internet, or any other suitable network. Such links may utilize any suitable communications technology or method, such as wireless optical, wireline optical, wireless radio, Sonet. Ethernet, ATM, France Relay, etc. Alternatively, one or more of these components may be separated in one or more network (s) other than the network serving the communication devices 105a, 105b, and 105c. For example, the suggestion generator 160 may be a component that is part of the network that serves the communication devices 105a, 105b, and 105c and may be used to generate suggestions for a service representative in that network. The suggestion generator 160 may also be a third party component that is part of a different network that generates suggestions for use by a third party, e.g., a service provider of another network that provides services to the users.

Information from the suggestion generator 160 and the service/network controller 150 may be used to influence/mitigate the mood of the users of the communication devices 105a, 105b, and 105c.

While the network/service controller 150 and suggestion generator 160 are shown in FIG. 1 as receiving input from the mood estimator 130, it should be appreciated that the network/service controller 150 and the suggestion generator 160 may operate based on any information indicative of a user's mood, not necessarily the information produced by the mood estimator 130.

Figure 2A:
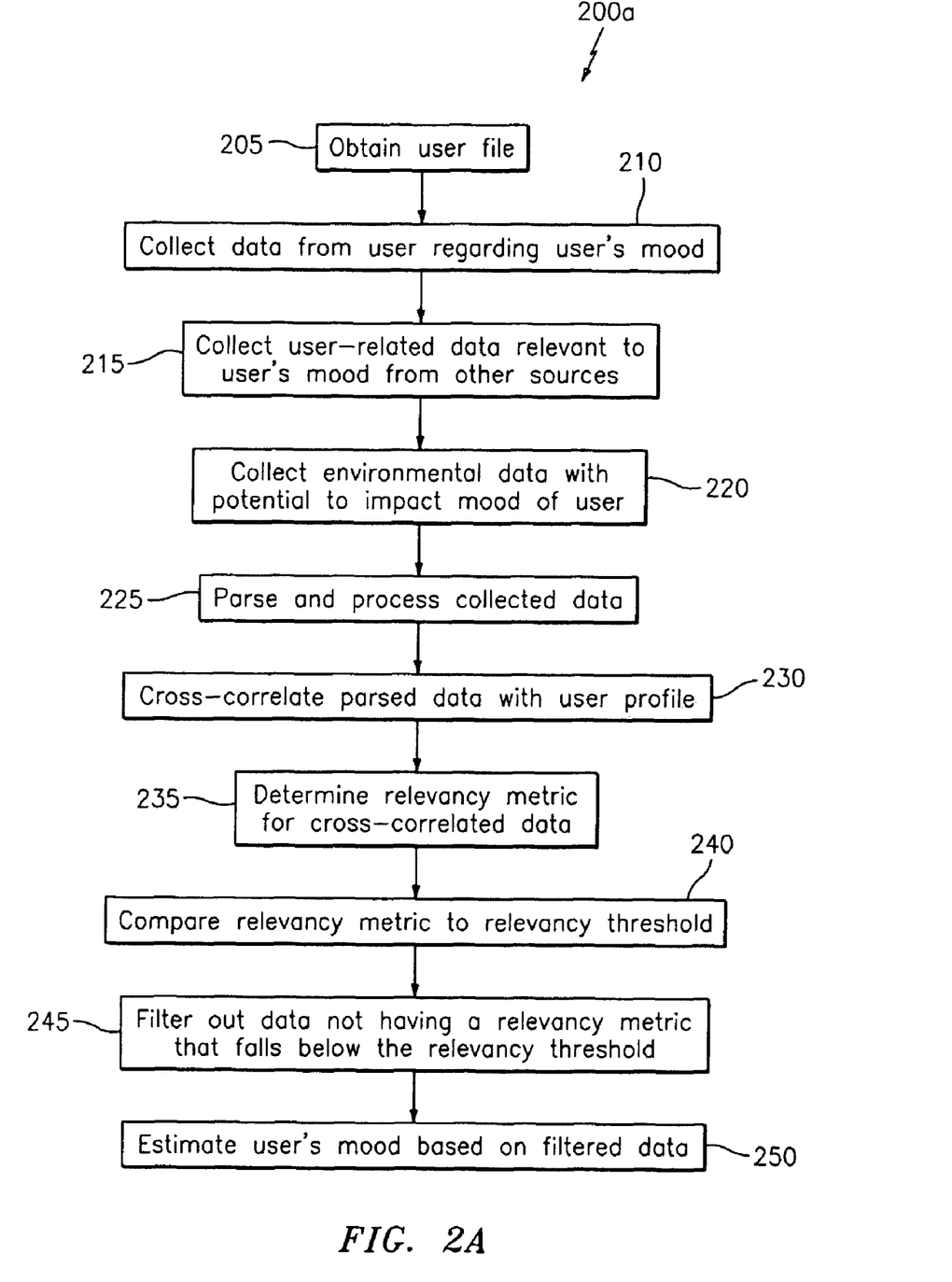
FIG. 2A illustrates a method for estimating a user's mood according to an exemplary embodiment.

According to an exemplary embodiment a method 200a for estimating a mood of a user is shown in FIG. 2A. Referring to FIG. 2A, a user profile is obtained at step 205. The user profile may be obtained, for example, from a database, such as the database 120, and delivered to an input processor, such as the input processor 125 shown in FIG. 1. At step 210, user-related data relevant to the users' moods is collected from the users via, e.g., the user devices 105a, 105b, and 105c. The collected data may be received by the input processor 125. The user-related data may include verbal inputs (e.g., detected voice), written text (e.g., emails, web comments, web responses), actions (e.g., keystrokes, clicks, web selections), and a logged history of any of the above. Other inputs indicative of mood may include series or scripts (e.g., indicating frustration or confusion), volume and stress indicators in voice, various indicators and patterns in written inputs (e.g., indicating confusion), keywords or phrases, and particular user selections, actions, and responses. At step 215, non-user data that may be potentially relevant to inferring the user's mood is collected, e.g., from sources 115 and input to the input processor 125. This non-user data may include information from other individuals, such as from members of communities with which the user is associated (e.g., family members, friends, co-workers, club members, etc.). Group mood data from a community of users may also be collected.

At step 220, environmental, external non-user specific data that may potentially affect the users' moods is collected, e.g., from sources 115 and input to the input processor 125. This external data may include information regarding news events that may affect the user's mood, e.g., traffic data or natural disaster updates, public event data, e.g., sports events, etc. This data may affect not only the user but also others in the user's community. At step 225, the collected data is parsed and processed, e.g., by the input processor 125. At step 230, the parsed and processed data is cross-correlated with the user profile, e.g., by the input processor 125. A relevancy metric may be determined based on the cross-correlated data at step 235, e.g., by the input processor 125. At step 240, the relevancy metric may be compared with a predetermined relevancy threshold, and data, such as environmental data, with a relevancy metric falling below the relevancy threshold may be filtered out at step 245. These steps may be performed by, e.g., the mood estimator 130. The user's mood is then estimated by, e.g., the mood estimator 130, based on the filtered data at step 250. The result may be output as a mood metric indicative of the estimated user's mood. It should be noted that the user profile may be optionally updated with the user's mood information, such that the profile can include a current user mood, last detected mood, and perhaps even mood history over time, all of which may be very helpful in more accurately accomplishing subsequent mood detection.

According to an exemplary embodiment, the relevancy thresholds may differ among users and may change over time. For example, if one user habitually talks loud and fast, whether or not the user is angry, the threshold for that user may be set such that loudness and quick speech are not indicative of mood. If another user usually talks in a soft voice and then starts to talk loudly, this might be an indication that the user is becoming upset. In this case, the threshold for this user would be set such that if the user begins to start talking loudly, the mood metric generated as a result of the process in FIG. 2A reflects that the user is upset. Such patterns may, e.g., be learned during service activation (or at other times), when a voice signature is recorded, analyzed, and qualified for a particular user. If the moods of particular users change such that the mood remains at different steady state for a period of time, the relevancy threshold, and the relevancy metric may be reset, as appropriate. For example, if a user that, in the past, habitually spoke softly then begins to habitually talk loudly, the relevancy threshold and relevancy metric may be changed, as appropriate such that the loud speech will not have an impact on mood estimation. The relevancy metrics may differ for various users and may change over time in a similar manner. Thus, the types of metrics and thresholds being used may be changed over time, such that a metric type and associated thresholds that are most useful for detecting a mood of a user at any given time are adopted and utilized, while metrics are abandoned when their sensitivity to mood of the user decreases significantly. A special threshold may be used when determining when to abandon one metric and adopt and utilize another metric.

While the steps illustrated in FIG. 2A are shown in a particular order, it should be appreciated that the steps can be performed in other orders and independent of each other. For example, steps 205, 210, 215, and 220 may be performed simultaneously or in any order. Also, step 250 may be performed before and independently of steps 240 and 245.

Figure 2B:
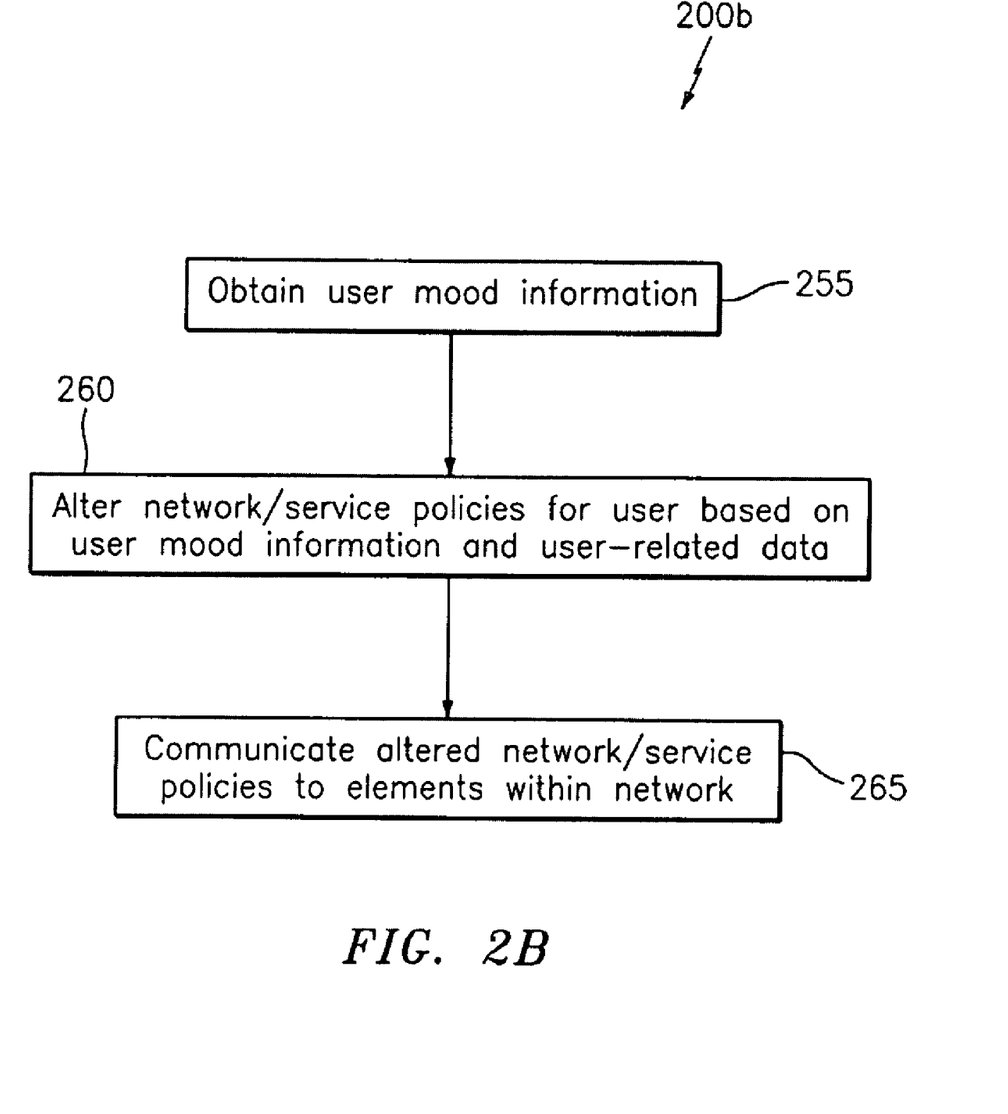
FIG. 2B illustrates a method for altering network/service policies based on a user's mood according to an exemplary embodiment.

FIG. 2B illustrates a method 200b for using user mood information for network/service control according to an exemplary embodiment. The mood information is obtained at step 255 by, e.g., the service/network controller 150. The mood information may be obtained using the method illustrated in FIG. 2A or by some other method. The service/network controller 150 applies predetermined rules to alter service/network policies based on the user's mood and user-related data at step 260. The user related data may include the user profile, information from the user, information for other resources regarding the user, and environmental information that may be relevant to the user. Altering of network/service control policies may include altering current actions, delaying actions, changing policy rules (to affect future decisions and/or actions). In extreme cases, this step may trigger an attempt to influence a user's mood, e.g., an attempt to mitigate anger by increasing priority of responding to the user, improving quality of service to the user, offering a free temporary upgrade, etc. Altering of network/service policies may also include altering service parameters (e.g., video resolution, volume, ad insertion frequency, etc.), altering policy rules affecting the user (to be used in further decision making relevant to the user), setting and/or altering CAC (Connection Admission Control) parameters/priorities, setting of delays, and setting of allowable delays, allowable quality, and allowable quality degradations. At step 265, altered network/service polices are communicated to elements within the network by the network service controller 150. Although not explicitly shown in FIG. 2B, it should be appreciated that, in addition to or as an alternative to altering policy rules, direct actions may also be taken. Direct actions may include, e.g., sending commands, control messages, signaling messages, etc., which are received by network elements and/or application entities. These elements and/or entities then respond in preconfigured ways, such that appropriate actions are implemented.

Figure 2C:
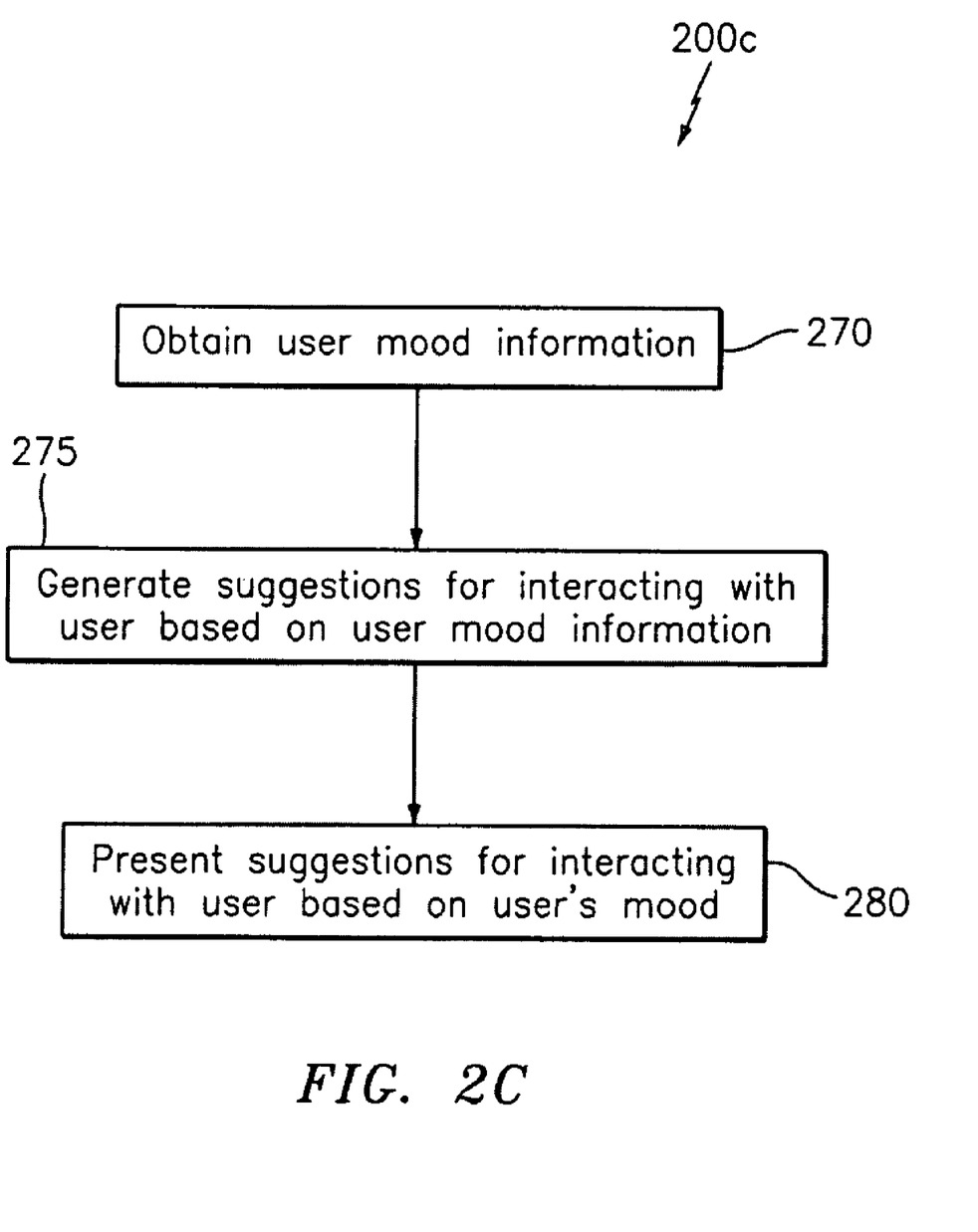
FIG. 2C illustrates a method for generating suggestions for interacting with a user based on the user's mood according an exemplary embodiment.

FIG. 2C illustrates a method 200c for presenting user mood information according to an exemplary embodiment. At step 270, user mood information is obtained by, e.g., the suggestion generator 160. The user mood information may be obtained using the method shown in FIG. 2A or by some other method. The mood information may be published, i.e., made available to, e.g., service representatives and/or third party service providers. The mood information may be published in various forms so as to be accessible by both machines and humans. This allows service providers (automated applications, human service representatives, etc.), and potentially third parties to use information regarding a user's mood to best serve a particular user/consumer. At step 275, suggestions for interacting with users may be generated by the suggestion generator 160, based on the mood information, rules, and user-related data. The user related data may include the user profile, information from the user, information for other resources regarding the user, and environmental information that may be relevant to the user. Suggestions for interacting with the user based on the user's mood are presented by the suggestion generator 160 at step 280. Some examples of types of interactions that may be suggested include offering content, altering how something is done (e.g., changing a service representative approach), re-prioritizing actions to take with regard to the user, changing the user profile (e.g., to show that the user is often confused and may need extra attention), and changing how ads are delivered to the user.

Figure 3:
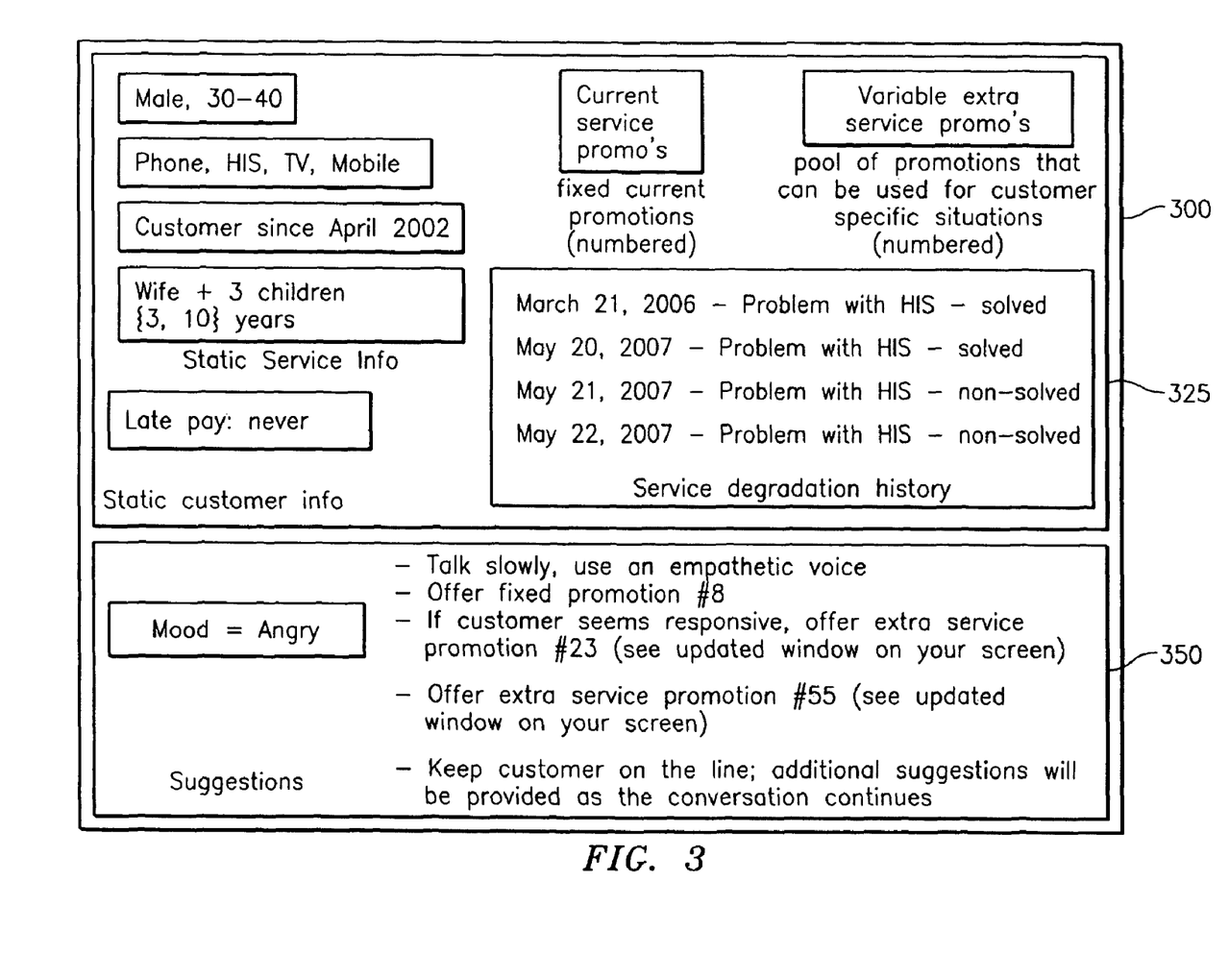
FIG. 3 illustrates an example of a user profile that may be presented, along with suggestions for interacting with the user, via a graphical user interface according to an exemplary embodiment.

FIG. 3 illustrates an example of a user profile 300 and suggestions for interacting with a user that may be presented via a graphical user interface according to an exemplary embodiment. As shown in FIG. 3, the user profile 300 may include static customer information 325. The static customer information 325 may include static service information, including, e.g., the user's age and gender, information regarding the user's services, e.g., phone high speed internet, television, mobile), how long the customer has been a customer, and information regarding the user's family, e.g., whether or not the user is married and how many children the user has, etc. Although not shown, the static information 325 may also include information indicating other characteristics or habits of the user, (e.g., address, occupation of the user, peak usage periods of the user, etc. The static customer information 325 may also include fixed current promotional information and a pool of promotional information. The pool of promotions may be used for customer specific situations, e.g., to provide promotions that might improve the user's mood. The static customer information 325 may further include service degradation history and payment history.

The graphical user interface depicted in FIG. 3 also includes suggestion information 350. The suggestion information 350 may include suggestions that may be used, e.g., by a service representative in communication with the user. The suggestion information 350 may include a mood indicator, along with specific suggestions, e.g., talk slowly, offer extra service promotions, etc. Although the suggestion information 350 is depicted at the bottom of the screen in FIG. 3, it should be appreciated that the suggestions may be presented as pop-ups anywhere on the screen. Moreover, it should be appreciated that the graphical user interface shown in FIG. 3 is one example of how suggestions may be presented. Other options for presenting suggestions may include other types of graphics, simple text, etc.

Figure 4:
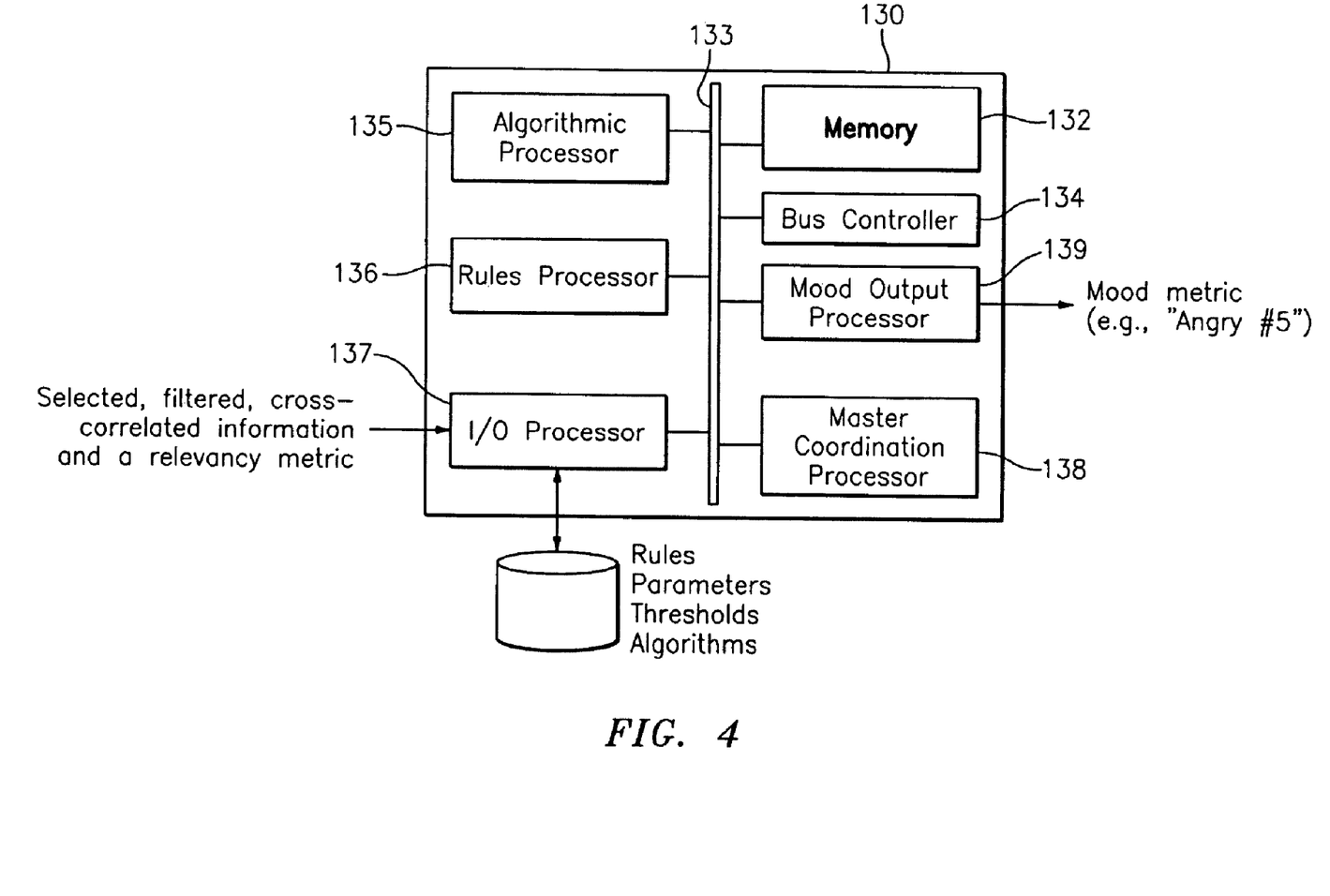
FIG. 4 illustrates details of a mood estimator according to an exemplary embodiment.

FIG. 4 illustrates details of a mood estimator, such as the mood estimator 130, according to all exemplary embodiment. As shown in FIG. 4, the mood estimator 130 includes a memory 132, an internal communication bus 133, an algorithmic processor 135, a bus controller 134, a rules processor 136, an I/O processor 137, a master coordination processor 138, and a mood output processor 139. The I/O processor 137 receives various inputs at various different times from the input processor 125. As shown in and described with reference to FIGS. 1 and 4, information received from the input processor 125 includes selected, filtered, cross-correlated information and a relevancy metric. It should be appreciated, however, that the input processor 125 may only pre-process data, e.g., scale, format, and/or translate data, and the selection, filtering, cross-correlation and/or generation of a relevancy metric may be performed by another component, which may be integrated with or separate from the mood estimator 130. The I/O processor 137 also receives rules, parameters, thresholds, and parameters, e.g., from a database. The I/O processor 137 parses and reformats the input data and sends the processed data to the master coordination processor 138.

The master coordination processor 138 determines what rules should be applicable and which algorithm to use, as well as the sequence and combination of rules/algorithms. Rules, parameters, thresholds and algorithms may be obtained from a database for this purpose. The master coordination processor 138 initiates instruction to the processors 135 and 136 to perform the steps described above with reference to FIG. 2A to generate results indicative of a user's mood. The mood information is communicated to the master coordination processor 138, which, in turn communicates the results to the mood output processor 139. The mood output processor 139 generates a mood metric based on the mood information. The bus controller 134 controls communication of information between the various components over the bus 133. The memory 132 may be used for short-term and long-term data storage, as appropriate, in a manner similar to the way in which memory is used in a general purpose computing device.

While processors are shown in FIG. 4 for simplicity of illustration, it should be appreciated that the various processors may be replaced with software running on a computer to perform the various processes described above. Also, the mood estimator may be implemented by adding software modules into existing servers or other elements of a network.

Figure 5:
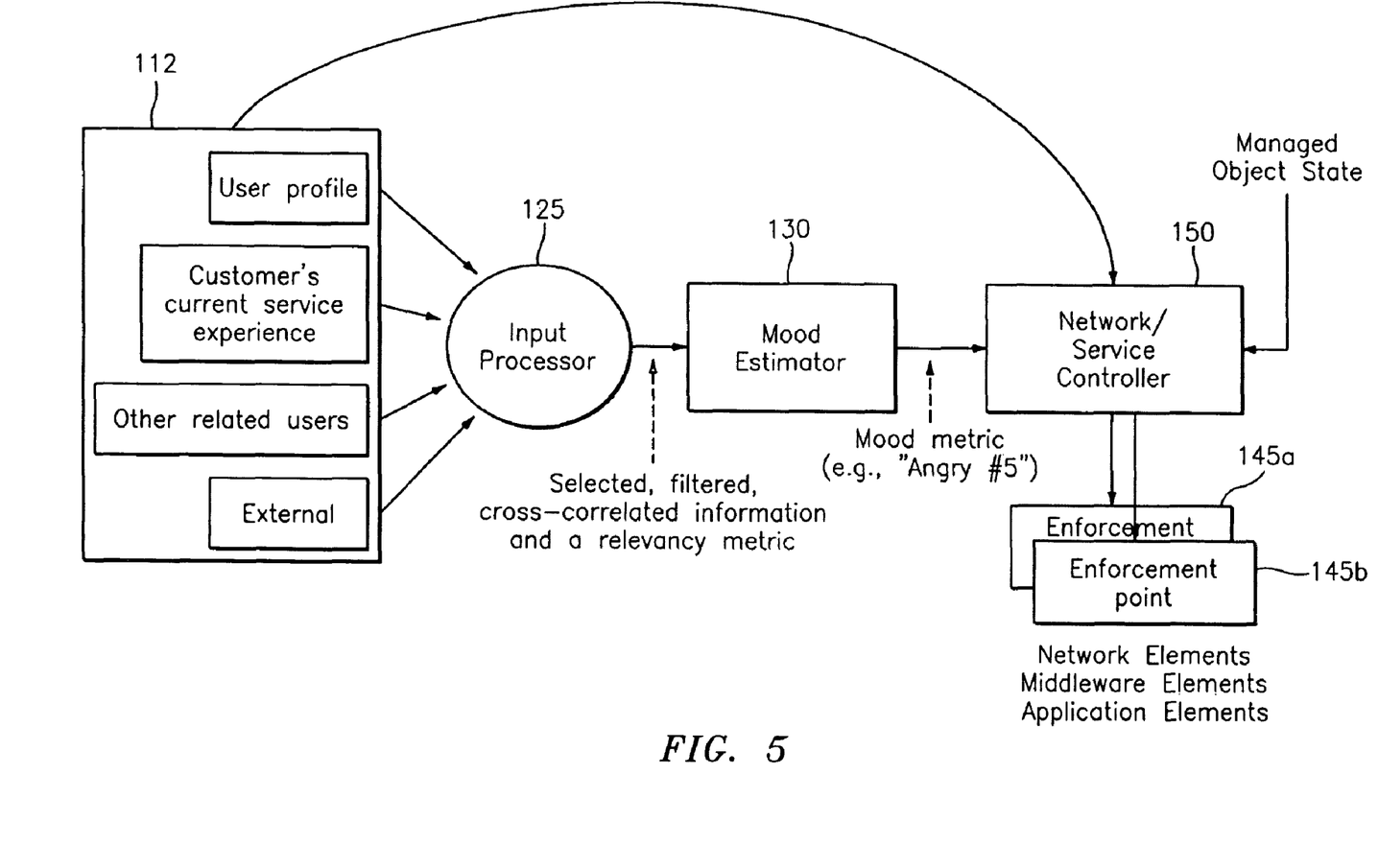
FIG. 5 illustrates an exemplary implementation of a network/service controller according to an exemplary embodiment.

FIG. 5 illustrates an exemplary implementation of a network/service controller, such as the network/service controller 150, according to an exemplary embodiment. In FIG. 5, the network is omitted for simplicity of illustration. It may be assumed, for simplicity of explanation, that all the components in FIG. 5 are part of the same network.

As shown in FIG. 5, the service/network controller 150 receives information that may be relevant to the user from various sources, including a user profile (such as that stored in the database 120 shown in FIG. 1), a user/customer's current customer experience (represented by the data collected from communication devices, such as the devices 105a, 105b, and 105c in FIG. 1), information from other users that may be relevant to the user, and external environmental information, e.g., information relating to external events. These are collectively labeled in FIG. 5 as element 112. The network/service controller 150 applies algorithms and rules from a database to alter network/service control policies based on mood information, such as the mood metric produced by the mood estimator 130. The network/service control policies may include, e.g., bandwidth, quality of service (QoS), routing, service parameters, security parameters, codec parameters, application parameters, and connection and session control information. The state of managed objects within the network, such as routers, router cards, processors, connections, sessions, data, a queue within a router, a counter, a variable, a model, etc., is also taken into account. The altered network/service policies are then communicated to various enforcement points 145a, 145b, etc. The enforcement points 145a, 145b may include network elements, middleware elements, and/or application elements. Although only two enforcement points are shown in FIG. 5 for simplicity of illustration, it should be appreciated that the network/service controller 150 may distribute altered network/service control policies to any number of enforcement points. It should also be appreciated that direct actions may be determined and accomplished, in addition to or as an alternative to altering policies, as discussed above.

As one example of altering controlling services based on a user's mood, assume that the network/service controller 150 receives a mood metric indicating that a particular user, Peter, is aggravated and that the user is currently receiving many ads. The policy controlling the frequency with which ads are delivered may be changed such that Peter is sent fewer ads. If this change in policy results in a change in the mood metric for Peter, indicating that Peter is less angry, this change in policy may be kept in place for Peter, at least temporarily. If this change in policy does not produce a change in the mood metric for Peter, then another policy may be changed, e.g., the quality of service provided to Peter may be improved.

Figure 6:
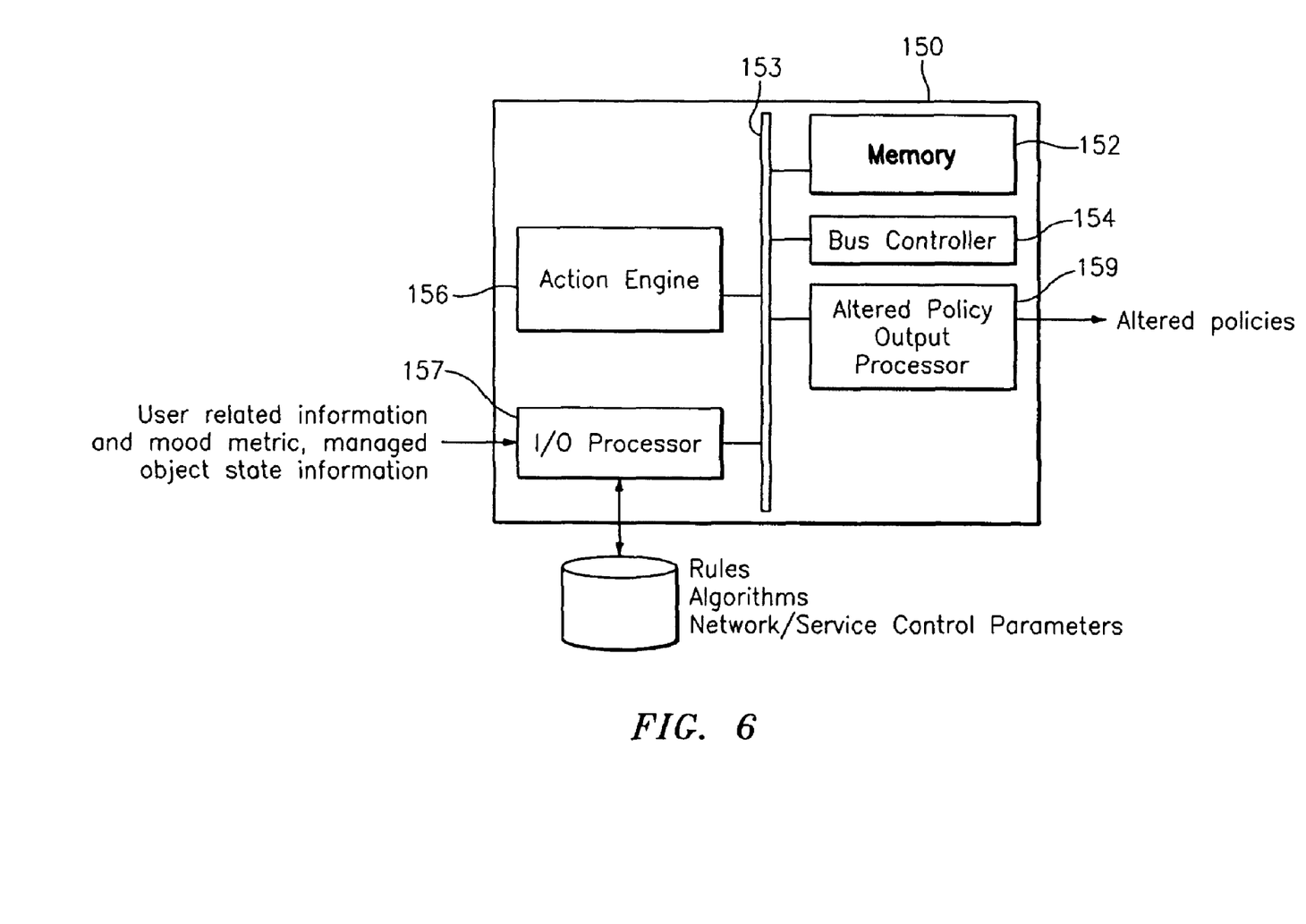
FIG. 6 illustrates details of a network/service controller according to an exemplary embodiment.

FIG. 6 illustrates details of a network/service controller, such as the network/service controller 150, according to an exemplary embodiment. As shown in FIG. 6, the network/service controller 150 includes a memory 152, an internal communication bus 153, an action engine 156, a bus controller 154, an I/O processor 157, and an altered policy output processor 159. The I/O processor 157 receives user related information and mood indicative information, as described above, and delivers it via the bus 1553 to the action engine 156. The I/O processor 157 also receives rules and network/service control parameters from, e.g., a database, and passes these on to the action engine 156. The action engine 156 performs the steps described above with reference to FIG. 2B to alter network/service policies based on rules and/or algorithms and network/service control parameters. The results are communicated to the altered policy output processor 159, which outputs the altered network/service control policies to the various enforcement points. The bus controller 154 controls communication of information over the bus. The memory 152 may be used for short-term and long-term data storage, as appropriate, similar to the way in which memory is used in a general purpose computing device. It should be appreciated that direct actions may be determined and accomplished in addition or as an alternative to altering policies, as described above.

While processors are shown in FIG. 6 for simplicity of illustration, it should be appreciated that the various processors may be replaced with software running on a computer to perform the various processes described above. Also, the network/service controller may be implemented by adding software modules into existing servers or other elements of a network.

Figure 7:
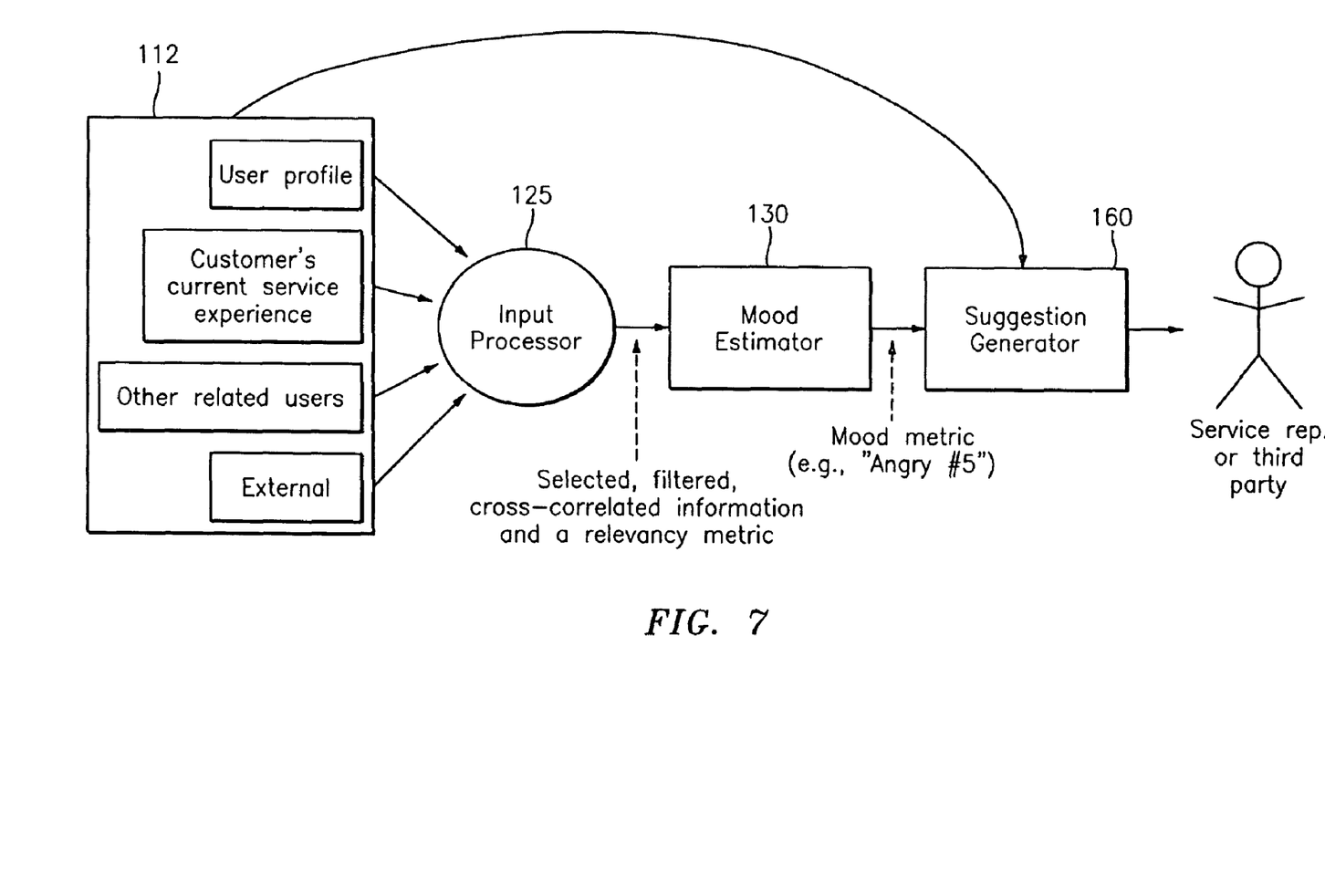
FIG. 7 illustrates an exemplary implementation of a suggestion generator according to an exemplary embodiment.

FIG. 7 illustrates an exemplary implementation of a suggestion generator, such as the suggestion generator 160, according to an exemplary embodiment. In FIG. 7, the network is omitted for simplicity of illustration. It may be assumed, for simplicity of explanation, that all the components in FIG. 7 are part of the same network.

As shown in FIG. 7, the suggestion generator 160 obtains collective information from element 112 (described above with reference to FIG. 5) and information indicative of a user's mood, e.g. a mood metric from the mood estimator 130. The suggestion generator 160 applies algorithms and rules from a database to generate suggestions. The rules may be changed as appropriate, based on current events, e.g., natural disasters, time of day, location of user, etc. The suggestions may be published and provided, e.g., to a service representative. The suggestions may also be published and provided to other providers, e.g., other service providers.

As one example of suggestion generation, assume that it is rush hour in a heavily congested part of a busy city. Assume that a particular user, Peter, is upset at that time. Taking this environmental data and user mood data into consideration, a suggestion may be generated to offer promotions or provide a nice message to Peter, with the intention of altering the Peter's mood so that he is less upset.

Figure 8:
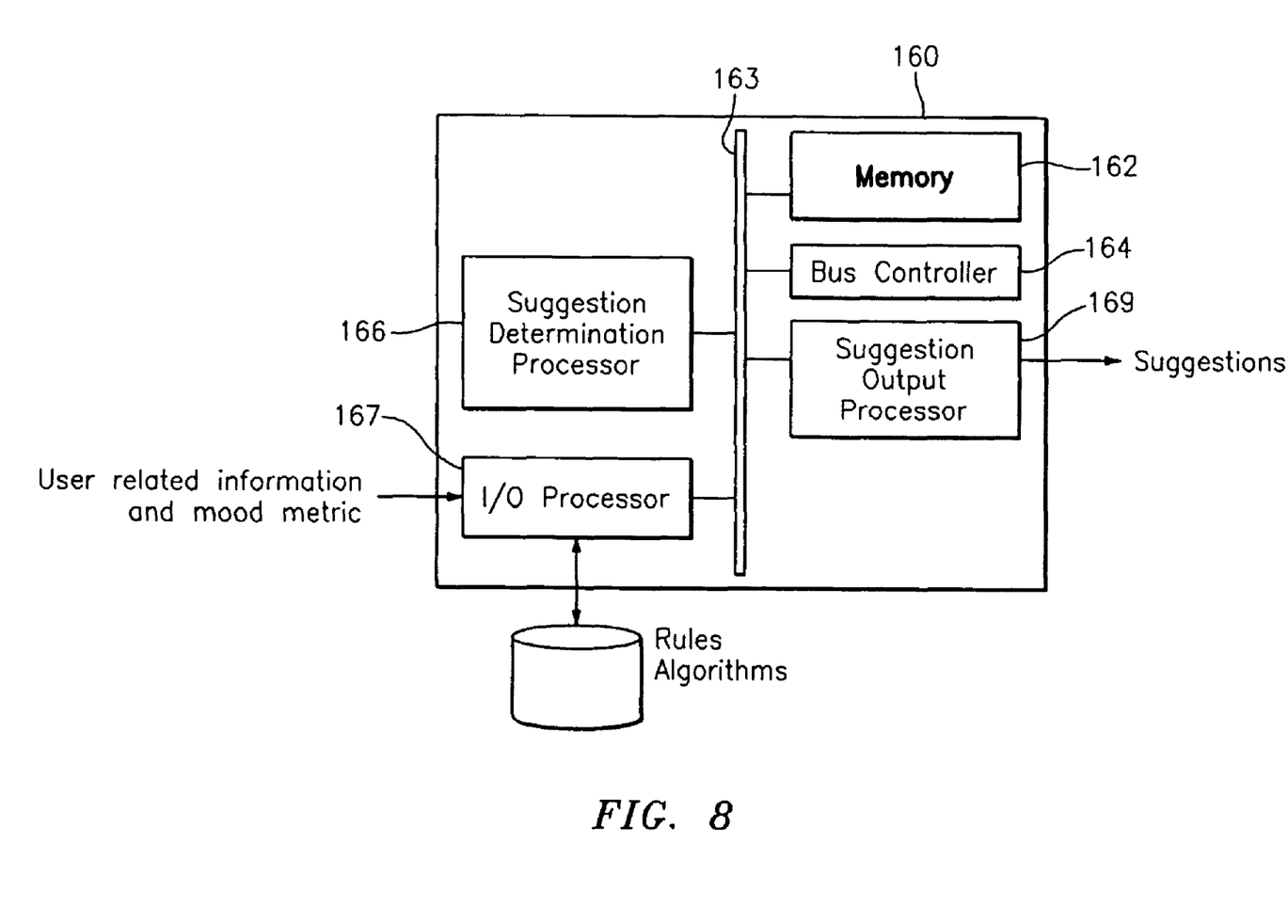
FIG. 8 illustrates details of a suggestion generator according to an exemplary embodiment.

FIG. 8 illustrates details of a suggestion generator, such as the suggestion generator 160, according to an exemplary embodiment. As shown in FIG. 8, the suggestion generator 160 includes a memory 162, an internal communication bus 163, a suggestion determination processor 166, a bus controller 164, and I/O processor 167, and a suggestion output processor 169. The I/O processor 167 receives user related information and information indicative of a user's mood as described above and passes this information to the suggestion determination processor 166 via the bus 163. The I/O processor 167 also receives rules and/or algorithms for generating suggestions, e.g., from a database, and passes these to the suggestion determination processor 166. The suggestion determination processor 166, in turn, generates suggestion for interacting with users based on rules and/or algorithms. The results are communicated to the suggestion output processor 169, which outputs suggestions for interacting with the users. The bus controller 164 controls communication of information over the bus 163. The memory 162 may be used for short-term and long-term data storage, as appropriate, similar to the way in which memory is used in a general purpose computing device.

While processors are shown in FIG. 8 for simplicity of illustration, it should be appreciated that the various processors may be replaced with software running on a computer to perform the various processes described above. Also, the suggestion generator may be implemented by adding software modules into existing servers or other elements of a network.

In the embodiments described above, moods of users are detected and responded to in real time. Rules for responding to the user may vary over time, depending on varying moods of the user.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed is:

1. A method for estimating a mood of a user, comprising:
   receiving a user profile;
   receiving data indicative of a user's mood from a communication device associated with the user;
   receiving data indicative of the user's mood from at least one source other than the user;
   receiving environmental non-user specific data with a potential impact on the user's mood;
   processing the data from the communication device and sources other than the user and the environmental data to filter out data that is not relevant to the user's mood;
   cross-correlating the filtered data with the user profile; and
   estimating the mood of the user based on the cross-correlated filtered data.

2. The method of claim 1, further comprising:
   determining a relevancy metric for the cross-correlated data based on rules;
   comparing the relevancy metric of the cross-correlate data to a relevancy threshold;
   filtering out data with a relevancy metric falling below the relevancy threshold, wherein the mood of the user is estimated based on the data having a relevancy metric that meets or surpasses the relevancy threshold; and
   generating a mood metric based on the filtered data.

3. The method of claim 2, wherein the relevancy threshold differs among users.

4. The method of claim 2, wherein the relevancy metric differs among users.

5. The method of claim 1, wherein the data indicative of the user's mood includes at least one of series and scripts, volume and stress indicators in voice, indicators and patterns in written input, keywords, phrases, user selections, user actions, and user responses.

6. An apparatus for estimating a mood of a user, comprising:
   an input for receiving a user profile, receiving data indicative of a user's mood from at least one communication device associated with the user, receiving data indicative of the user's mood from sources other than the user, and receiving environmental data with a potential impact on the user's mood; and
   a processor for processing the collected data to filter data that is not relevant to the user's mood, cross-correlating the filtered data with the user profile, and estimating the mood of the user based on the cross-correlated filtered data.

7. The apparatus of claim 5, wherein the processor determines a relevancy metric for the cross-correlated data, compares the relevancy metric of the cross-correlate data to a relevancy threshold, and filters out data with a relevancy metric falling below the relevancy threshold, wherein the mood of the user is estimated based on the data having a relevancy metric that meets or surpasses the relevancy threshold.

8. The apparatus of claim 7 wherein the relevancy threshold differs among users.

9. The apparatus of claim 7, wherein the relevancy metric differs among users.

10. The apparatus of claim 5, wherein the data indicative of the user's mood includes at least one of series and scripts, volume and stress indicators in voice, indicators and patterns in written input, keywords, phrases, user selections, user actions, and user responses.

11. A computer program product for estimating a mood of a user, comprising a computer usable medium having a computer readable program, wherein the computer readable program includes instructions that, when executed on a computer, cause the computer to:
    receive a user profile;
    receive data indicative of a user's mood from a communication device associated with the user;
    receive data indicative of the user's mood from sources other than the user;
    receive environmental data with a potential impact on the user's mood;
    process the collected data to filter data that is not relevant to the user's mood;
    cross-correlate the filtered data with the user profile; and
    estimate the mood of the user based on the cross-correlated filtered data.

12. The computer program product of claim 11, wherein the computer program further includes instructions that, when executed on the computer, cause the computer to:
    determine a relevancy metric for the cross-correlated data;
    compare the relevancy metric of the cross-correlate data to a relevancy threshold; and
    filter out data with a relevancy metric falling below the relevancy threshold, wherein the mood of the user is estimated based on the data having a relevancy metric that meets or surpasses the relevancy threshold.

13. The computer program product of claim 12, wherein the relevancy threshold differs among users.

14. The computer program product of claim 12, wherein the relevancy metric differs among users.

15. The computer program product of claim 11, wherein the data indicative of the user's mood includes at least one of series and scripts, volume and stress indicators in voice, indicators and patterns in written input, keywords, phrases, user selections, user actions, and user responses.

* * * * *